H. C. SEIPP.
SIDEWALK LIGHT AND OTHER LIKE CONSTRUCTIONS.
APPLICATION FILED NOV. 17, 1915.
1,265,395. Patented May 7, 1918.
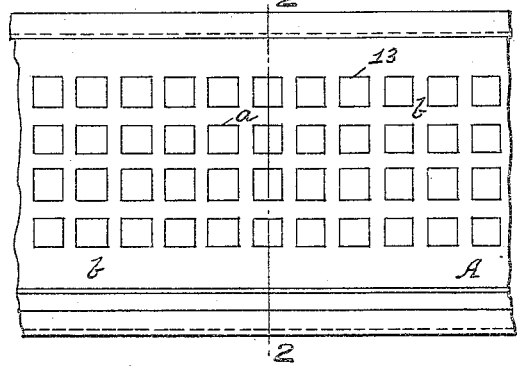
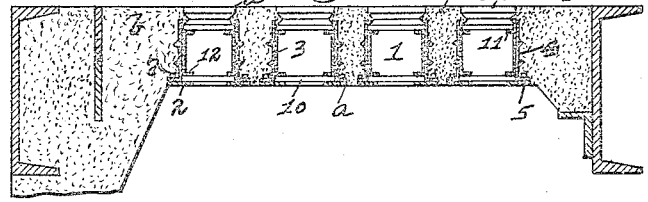
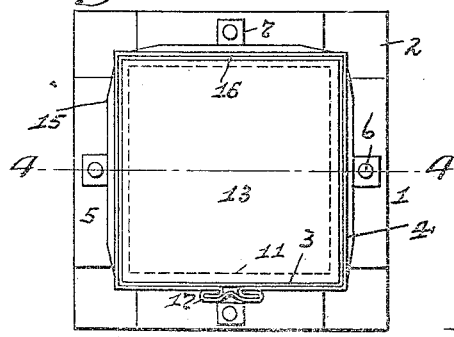
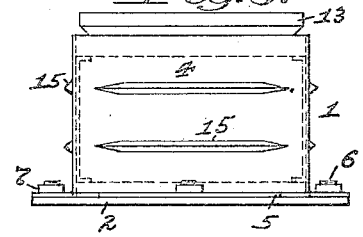
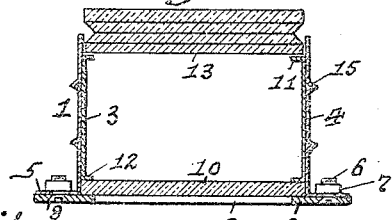
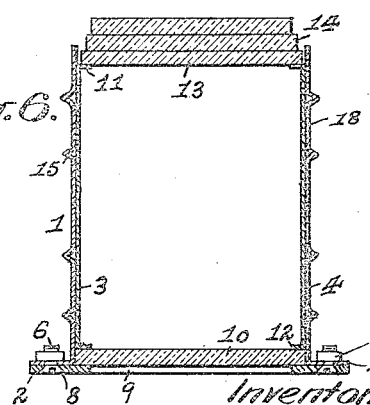
Witnesses:
Inventor.
Henry C. Seipp.
By J. W. Cooke
Attorney.

UNITED STATES PATENT OFFICE.

HENRY C. SEIPP, OF PITTSBURGH, PENNSYLVANIA.

SIDEWALK-LIGHT AND OTHER LIKE CONSTRUCTIONS.

1,265,395.      Specification of Letters Patent.      Patented May 7, 1918.

Application filed November 17, 1915. Serial No. 61,911.

*To all whom it may concern:*

Be it known that I, HENRY C. SEIPP, a citizen of the United States, and a resident of Pittsburgh, in the county of Allegheny and State of Pennsylvania, have invented a new and useful Improvement in Sidewalk-Lights and other like Constructions; and I do hereby declare the following to be a full, clear, and exact description thereof.

My invention relates to side-walk lights, floor lights, roof lights and other like constructions, and has special reference to the container or supporting means for the lights employed.

The object of my invention is to form a cheap, simple and efficient container for the lights of side walks and other similar constructions, and one in which the light and container will form a unit, so as to enable shipment and handling for erection, as well as one in which the parts are removable for renewing or cleaning the lights, and will enable the parts to give greater lighting power and will also permit the parts to be kept clean.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved construction for side walk lights etc., I will describe the same more fully referring to the accompanying drawings, in which—

Figure 1 is a top plan view of a side-walk showing my invention applied thereto;

Fig. 2 is a section of the same on the line 2—2 Fig. 1;

Fig. 3 is a plan view of one of the containers;

Fig. 4 is a sectional view of the same on the line 4—4 Fig. 3;

Fig. 5 is an elevation of the same; and

Fig. 6 is a sectional view showing another form of the container.

Like symbols of reference herein indicate like parts in each of the figures of the drawing.

As illustrated in the drawing my improved lighting unit or container for sidewalk lights and other like constructions is shown at 1, and which is square or rectangular in shape and is preferably formed from sheet metal, such as steel or iron, and cast, pressed or stamped to shape. The unit or container 1 comprises the bottom cover plate 2, inner sleeve 3, and outer sleeve 4, such outer sleeve being provided with the lips or flanges 5 at its lower end which are adapted to be connected to the plate by means of said flanges engaging the upper face of the plate and secured thereto by the bolts 6 passing through said flanges and plate and through nuts 7 on the upper face of said flanges, while the heads 8 on said bolts are preferably counter sunk in the bottom face of said plate. The bottom plate 2 is provided with an opening 9 centrally of the same, and a lower light or tile 10, preferably formed of clear glass, is adapted to fit within the outer sleeve 4, over said opening and rest upon said bottom plate. The inner sleeve 3 fits within and against the outer sleeve 4 and is provided with upper and lower flanges 11 and 12 respectively, so that the latter will fit against the lower light or tile 10, and such tile may be permanently secured to said flange 12 and the bottom plate 2 by cementing or in any other suitable manner. The upper light or tile 13, preferably formed of clear glass, and of a plurality of superposed horizontal laminations, such as is shown, described and claimed in my United States Letters Patent No. 1,146,961, dated July 20, 1915, fits within the outer sleeve 4 and against the upper flange 11 on the inner sleeve 3, and such tile is permanently secured to said flange by cementing or in any other suitable manner.

In the use of my improved unit or container 1 in a side-walk construction, such as is shown at A, such construction is built up in any suitable or approved manner by means of a number of such containers suitably supported and placed with the edges of the flange 5 and bottom plates 2 against each other, and which form spaces *a* between each of the outer sleeves 4 and upper tiles 13, when these units or containers 1 are thus set in place, the top of the side walk is finished by pouring and spreading of cement *b* which fills such spaces *a* and all voids and crevices in the parts, such cement being then troweled down to a smooth finished upper surface level with the tiles 13, so that when set and dry it completes the finished structure.

If desired, the laminations of the tiles 13 may be formed in steps, as shown at 14, in order to allow for more cement around the same and within the unit or container 1, and the outer sleeve 4 of the container can be provided with outwardly extending ribs 15, in order to assist in holding the same within the cement.

Any suitable form of joints 16 and 17 can be formed in the inner and outer sleeves 3 and 4 respectively in order to form a strong and air tight joint connection in such parts, while in case it is desired to use deeper units or containers, the inner sleeve 3 can be made larger and the outer sleeve 4 remain, as a standard with an extension 18 placed over the upper ends of the sleeve 3 and fitting around such sleeve and abutting against the upper edge of the outer sleeve 4, as shown in Fig. 6.

Various other modifications and changes in the application, design and construction of my improved light unit or container may be resorted to without departing from the spirit of the invention, or sacrificing any of its advantages.

When the units or containers 1 are installed in a side walk or other construction the interior of the inner sleeve and under face of the bottom plate can be coated with a dipping of white enamel or other suitable material and in any other suitable manner, so that the inner coating will enable a greater reflecting surface for the light through the units and will enable the same and the inner face of the units to be kept clean.

The space between the upper and lower tiles will be kept hermetically sealed, as described, so that the units will always remain clean on their interior and will always remain white for reflection, while such tiles can also be renewed when desired, and can be renewed at will by simply taking out the screw bolts, thus enabling the bottom plate of the unit to be removed for taking out or renewing the lights or repairing the same and parts. In such case, the nuts remain in the cement and thus be in position for the insertion of the bolts in replacing the bottom plate.

What I claim as my invention and desire to secure by Letters Patent is:—

1. A unitary light container for side walk and other similar lights, comprising an outer sleeve having flanges at the bottom of the same, an inner sleeve within the said outer sleeve, an upper lighting lens or tile secured within said outer sleeve and above said inner sleeve, a removable bottom plate having a central opening in the same connected to said flanges, and a lower transparent tile between said inner sleeve and said plate.

2. A unitary light container for side walks and other similar lights, comprising an outer sleeve having flanges at the bottom of the same, an inner sleeve within said outer sleeve, an upper lighting lens or tile secured within said outer sleeve and above said inner sleeve, a removable bottom plate having a central opening in the same connected to said flanges, a lower transparent tile between said inner sleeve and said plate, and means for removably connecting said plate to said flanges.

3. A unitary light container for side walks and other similar lights, comprising an outer sleeve having flanges at the bottom of the same, an inner sleeve within said outer sleeve, an upper lighting lens or tile secured within said outer sleeve and above said inner sleeve, a removable bottom plate having a central opening in the same connected to said flanges, a lower lighting lens or tile between said inner sleeve and said plate, and removable bolts passing through said flanges and plate and connecting with nuts on the upper face of such flanges for securing said plate to said flanges and to permit the removal of said plate.

4. A unitary light container for side-walk and other similar lights comprising an outer sleeve, an inner sleeve within said outer sleeve, a removable bottom plate, having a central opening in the same, and lighting lens or tiles supported within said sleeves.

5. A unitary light container for side-walk and other similar lights comprising an outer sleeve, an inner sleeve within the said outer sleeve, a removable bottom plate having a central opening in the same, a lighting tile or lens supported within said outer sleeve and on the upper edge of said inner sleeve, and a lighting tile or lens supported between said inner sleeve and said plate.

6. In a side-walk and other like constructions, the combination with a unitary light container for being embedded in cement or concrete forming part of said construction, said container being composed of an outer sleeve having flanges at the bottom of the same, an inner sleeve within said outer sleeve, a removable bottom plate having a central opening in the same connected to said flanges, lighting lenses or tiles supported in said sleeves, nuts on the inner face of said flanges, and bolts passing through said flanges and plate and engaging with said nuts for securing said plate to said flanges and to permit the removal of said plate, thereby leaving the nuts embedded in said concrete for the replacing of said plate and bolts.

7. A unitary light container for side-walks and other similar lights comprising an outer sleeve, an inner sleeve within said outer sleeve, a lighting tile or lens supported within said outer sleeve and on the upper edge of said inner sleeve, a lighting tile or lens within said outer sleeve and abutting the lower edge of said inner sleeve, and means for securing said last-named tile or lens in place.

8. A unitary light container for sidewalks and other similar lights comprising an outer sleeve, an inner sleeve within said outer sleeve, an upper lighting lens secured within said outer sleeve and above said inner sleeve, a lower lighting lens within said outer sleeve, and abutting said inner sleeve, and means for removably securing said last-named lens in place.

In testimony whereof, I the said HENRY C. SEIPP, have hereunto set my hand.

HENRY C. SEIPP.

Witnesses:
J. N. COOKE,
H. C. SEIPP, Jr.

Copies of this patent may be obtained for five cents each, by addressing the "Commissioner of Patents, Washington, D. C."